Aug. 15, 1944.  H. L. MUELLER  2,355,743

ROLLER

Filed Jan. 9, 1942

INVENTOR.
HOMER L. MUELLER
BY *Oberlin, Limbach & Day.*
ATTORNEYS

Patented Aug. 15, 1944

2,355,743

UNITED STATES PATENT OFFICE 2,355,743

ROLLER

Homer L. Mueller, Cleveland, Ohio, assignor to The Cleveland Welding Company, Cleveland, Ohio, a corporation of Ohio Application January 9, 1942, Serial No. 426,219

3 Claims. (Cl. 74—230.8)

This invention relates as indicated to rollers, and more particularly to an improved roller especially adapted to serve as supporting means for endless trackway for half-track trucks and the like.

Since such rollers are subjected to high stresses and strains in use it is necessary that the same be of strong and rigid construction. On the other hand, it is very desirable that the weight be kept at a minimum so that heavy castings and forgings are generally to be avoided. Moreover, when cored castings are employed as in the past, the rollers will invariably be off balance unless considerable machining is done and such machining is expensive and time-consuming.

It is therefore a primary object of this invention to provide a roller for endless trackways and more particularly a top roller adapted to support the upper course of the tread of half-track trucks of the type commonly employed for military purposes.

A further object of this invention is to provide such a roller which will be both light and strong, yet capable of accurate mounting within close tolerances.

Still another object is to provide a roller which may be vary rapidly constructed in large quantities with a minimum use of steel.

Other objects of this invention will appear as the description proceeds.

To the accomplishment of the foregoing and related ends, the invention, then, comprises the features hereinafter fully described, and particularly pointed out in the claims, the following description and the annexed drawing setting forth in detail certain illustrative embodiments of the invention, these being indicative however, of but a few of the various ways in which the principle of the invention may be employed.

In said annexed drawing—

Figure 2:
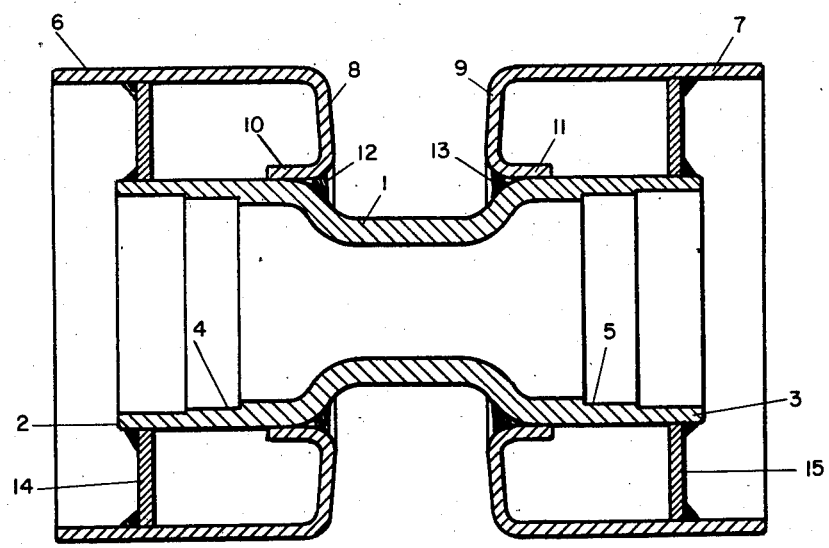
Figure 1:
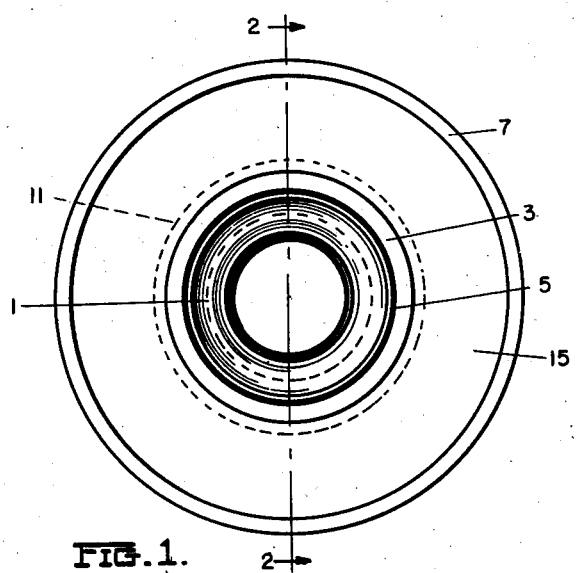

Fig. 1 is an end elevational view of my new roller, and Fig. 2 is a cross-sectional view of such roller taken along the line 2—2 on Fig. 1.

Referring now more specifically to such drawing, my new roller comprises a tubular inner member 1 having end portions 2 and 3 of greater diameter than its central portion. Bearing seats 4 and 5 are provided in said respective end portions. Annular side members 6 and 7 encompass said respective end portions and are secured thereto by welding. More particularly these side members comprise tubular sections of greater diameter than the end portions of the inner member and have inwardly directed flanges 8 and 9 which are upset at their inner ends 10 and 11 and welded to the shoulders of the tubular inner member at 12 and 13. Braces in the form of flat radially extending rings 14 and 15 are provided and welded to the respective end portions of the tubular inner member and the annular side members. This arrangement affords a strong box-like construction adapted to carry the stresses to which it is subjected directly to the supporting bearings.

The tubular inner member may be formed from a length of seamless tubing, for example, and swedged down as shown. Only the portion to be swedged need be heated. The bearing seats are concentric within close limits.

The annular side members are preferably formed of sheet steel by stamping, punching out the center portion, and upsetting the lip of the radially inwardly directed flange resulting. Such members are then trimmed and welded to the tubular inner member by means of an automatic continuous arc-welder. The flat rings 14 and 15 are similarly welded in place providing a sealed unit of exceptional strength. Also, a light, well-balanced structure is obtained withou the necessity of machining.

It will thus be seen that a roller has been provided which may be constructed in large part of sheet steel for example, and which is adapted for rapid and large scale production. Such roller is moreover strong and rigid and well adapted to resist the strains and stresses to which it will be subjected in use.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:

1. A roller comprising a tubular inner member having end portions of greater diameter than its central portion, annular side members encompassing and secured to said respective end portions, said side members comprising tubular sections of greater diameter than said end portions having their opposed ends flanged inwardly and respectively welded to said tubular inner member at either side of said central portion, and supporting means welded in a position to support said tubular inner member adjacent the ends thereof and to support the inner peripheries of said annular side members at a zone spaced back from their ends.

2. A roller comprising a tubular inner member having end portions of greater diameter than its central portion, spaced annular side members encompassing and mounted on said respective end portions, said side members comprising tubular sections of greater diameter than said end portions having radially inwardly directed flanges respectively welded to said tubular inner member at either side of said central portion, and additional supporting means comprising flat radially extending rings welded in a position to support said tubular inner member adjacent the respective ends thereof and to support the inner peripheries of said respective annular side members at a zone spaced back from their ends.

3. A roller comprising a tubular inner member having end portions of greater diameter than its central portion, annular side members comprising tubular sections of greater diameter than said end portions and encompassing same concentrically, said side members having inwardly turned flanges on their opposed ends which flanges are united to said tubular inner member adjacent the central portion of decreased diameter and on each side thereof, and means for bracing the intermediate zone of each said annular side member against the end portion of said tubular inner member.

HOMER L. MUELLER.